United States Patent Office 3,501,265
Patented Mar. 17, 1970

3,501,265
METHOD FOR PREPARING AND ISOLATING CYANONICKELATES OF SODIUM AND POTASSIUM
Edward A. Sullivan, Beverly, Mass., assignor to Ventron Corporation, Beverly, Mass., a corporation of Massachusetts
No Drawing. Continuation-in-part of application Ser. No. 548,353, May 4, 1966. This application Feb. 24, 1969, Ser. No. 801,866
Int. Cl. C01c 3/08
U.S. Cl. 23—77       4 Claims

ABSTRACT OF THE DISCLOSURE

The invention provides a method for preparing and isolating in a single step synthesis a cyanonickelate of an alkali metal selected from the group consisting of sodium and potassium. The method comprises reacting a nickel salt with a cyanide of the selected alkali metal in relative proportion of about one mole of said salt and about four moles of said cyanide in an amount of water sufficient to dissolve the reactants while permitting precipitation of the major portion of the formed alkali metal cyanonickelate upon cooling the reaction mixture to a temperature between room temperature and about 5° C. The nickel salt used is selected from those which form corresponding alkali metal salts having a water solubility in excess of about 25 grams per 100 grams of water at 25° C.

---

This invention relates to the preparation of cyanonickelates of sodium or potassium by the metathetical reaction of a nickel salt and an alkali metal cyanide. Sodium and potassium cyanonickelates are useful as components in electroplating baths and as catalysts in certain textile dyeing systems. This application is a continuation-in-part of my application Ser. No. 548,353, filed May 4, 1966.

Prior to the present invention, sodium and potassium cyanonickelates were prepared and isolated by a two-step synthesis. In the first step, nickel cyanide was prepared by reacting the alkali metal cyanide with a nickel salt in water as illustrated by the equation:

$$NiX_2 + 2KCN \rightarrow Ni(CN)_2 + 2KX \quad (1)$$

The precipitated nickel cyanide was isolated, washed and then dissolved in an aqueous solution of the stoichiometric amount of alkali metal cyanide to form a solution of the alkali metal cyanonickelate as illustrated by the equation:

$$Ni(CN)_2 + 2KCN \rightarrow K_2Ni(CN)_4 \quad (2)$$

The product then was crystallized by evaporation, filtered and dried. This two-step synthesis was necessary to avoid contamination by the by-product potassium salts (Inorg. Synth., vol. 2, page 227). This method is cumbersome not only because it involves two separate reactions, but because the nickel cyanide produced as illustrated by the above Equation 1 is extremely difficult to isolate. The nickel cyanide, even when digested, is so finely divided that it tends either to pass through the filter medium or to plug up its pores.

I have discovered that sodium or potassium cyanonickelate can be prepared and precipitated directly by reacting an alkali metal cyanide with certain nickel salts in the proportion of four moles of alkali metal cyanide and one mole of nickel salt in an amount of water sufficient to dissolve the reactants while permitting precipitation of the major portion of the formed alkali metal cyanonickelate upon cooling the reaction mixture to a temperature between room temperature and about 5° C.

The nickel salt used should be one which forms a corresponding alkali metal salt having a water solubility in excess of about 25 grams per 100 grams of water at 25° C. The cyanonickelate is precipitated in good yield and good purity in the form of well formed crystals which are readily filtered and centrifuged. As illustrative of nickel salts which may be used, I may mention the acetate, chloride, bromide, iodide, nitrate and sulfate.

The quantity of water used will differ for any particular set of reactants, depending not only on their individual solubilities but also on that of the reaction by-product. A certain amount of latitude is available in choosing this quantity of water to facilitate handling of the reaction mixture and to provide a means of absorbing the heat of reaction. Limited variations in the total quantity of water employed do not render the invention inoperable. Allowable variations will be obvious to those skilled in the art.

Example 1

To a stirred solution of 117 grams of nickel chloride (composition by analysis—$NiCl_2 \cdot 4 \cdot 4H_2O$) or 0.56 gm.-mole, dissolved in 300 ml. of water, in a one-liter flask, was added a solution of 118 grams of technical grade (96%) sodium cyanide in 200 ml. of water, or 2.31 moles. Since the desired 4/1 mole ratio of cyanide to nickel salt would require 2.24 moles, a 3% excess of cyanide is used in this case to insure complete conversion of the nickel salt. The stirred mixture became warm (67° C.) due to the heat of reaction. Even while warm, crystals of sodium cyanonickelate appeared and their quantity increased as the mixture cooled to room temperature. The mixture was chilled in a refrigerator (10° C.) overnight to optimize the yield. The crystals were suction-filtered and vacuum dried at 70–80°. A total of 108.4 grams of sodium nickel cyanide was recovered containing 0.62% water and 4.1% sodium chloride; the content of anhydrous sodium nickel cyanide was 103.3 grams of 88.5% of theoretical. The yield is actually better than this because the theoretical value includes some dissolved product which is unrecoverable.

Example 2

One hundred twelve grams of 98% sodium cyanide (2.24 gm.-moles) were dissolved in 500 ml. of water. To this stirred solution were added slowly 117 grams of solid nickel chloride (composition by analysis=$NiCl_2 \cdot 4 \cdot 4H_2O$)

or 0.56 gm.-mole. The mixture was post-stirred to insure complete reaction and cooled to dissipate the heat of reaction. The chilled mixture was filtered and the crystals vacuum dried at 80° C. A total of 104.2 grams of dry crystals was recovered which contained 0.80% water and 6.1% sodium chloride. The content of anhydrous sodium cyanonickelate was 97.0 grams or 79.4% of the theoretical, as explained in Example 1.

This example demonstrates that the reactants need not both be predissolved to utilize this invention. The essential criterion is that the total amount of solvent used be minimized so as to recover as much pure product as possible.

Example 3

In plant equipment, 512 lbs. of nickel chloride (composition by analysis=$NiCl_2 \cdot 4 \cdot 4H_2O$) or 2.45 lb. moles were dissolved in 105 gals. (876 lbs.) of water. In a separate tank, 500 lbs. of 96% sodium cyanide (9.80 lbs. moles) were dissolved in 150 gals. (1252 lbs.) of water. The nickel chloride solution was added to the sodium cyanide solution over about 30 minutes, during which time the temperature of the reaction mixture rose from 27 to 57° C. The mixture was post-stirred for 3½ hours and cooled to 5–10°. The reaction mixture was then centrifuged. The crystals of sodium nickel cyanide were easily centrifuged in a single pass without need for recycling the mother liquor. The wet crystals were discharged to trays and loaded into a vacuum dryer. Most of the crystals were dried in one lot at 65° C.; 428½ lbs. of product containing 13.9% water of hydration and 1.5% sodium chloride were recovered (equivalent to 362½ lbs. of anhydrous sodium cyanonickelate). The balance of the crystals were vacuum dried at 65° C. for a shorter period of time; 56 lbs. of product containing 17.5% water of hydration and 0.8% sodium chloride were recovered (equivalent to 45½ lbs. of anhydrous sodium cyanonickelate). The total yield of 408 lbs. on an anhydrous basis represents an 80% yield. It is known that in this case some mechanical losses occurred during transfer of materials, so that a higher yield can be expected when the difficulties encountered are avoided. The water of hydration contained in the product is due to the lower drying temperature in this example; since it does not interfere with the utilization of the cyanonickelate, it cannot be considered an impurity.

The above examples show how sodium nickel cyanide can be made in a one-step process in good yield and purity. The same method can also be applied to the preparation of potassium nickel cyanide, $K_2Ni(CN)_4$. In this case, the yield obtained, as a percentage of theoretical, is lower due to the greater solubility of the complex potassium salt in the by-product solution. Even with the lower yield, however, this method constitutes a significant improvement over the prior art, for excellent purity is obtained simply and rapidly, and therefore more economically.

Example 4

To a stirred solution of 117 grams of nickel chloride (composition by analysis=$NiCl_2 \cdot 4 \cdot 4H_2O$) or 0.56 gm.-mole in 85 ml. of water was added a solution of 162 gms. of 96% potassium cyanide (2.39 gm.-moles) in 235 ml. of water. The stirred mixture became warm due to the heat of reaction; the maximum temperature was 86° C. At this temperature all of the reaction products were in solution; only on cooling were crystals of potassium cyanonickelate formed. As in the previous examples, the mixture was cooled to 10° C. The crystals were filtered and vacuum dried at 80° C. A total of 84.5 gms. of product was recovered which contained 0.32% water and 1.4% potassium chloride; the anhydrous $K_2Ni(CN)_4$ content was 83.1 grams of 61.6% of theoretical, as explained previously.

Example 5

In plant-scale equipment, 370 lbs. of nickel chloride (composition by analysis=$NiCl_2 \cdot 4 \cdot 4H_2O$), or 1.77 lb.-moles, were dissolved in 48 gallons (401 lbs.) of water. In a separate tank, 500 lbs. of technical grade (96%) potassium cyanide (7.37 lb.-moles) were dissolved in 87 gallons (726 lbs.) of water. The nickel chloride solution was added to the potassium cyanide solution in about thirty minutes, during which time the mixture's temperature rose to a maximum of 48° C. The mixture was stirred and cooled to 5° C. The bright orange crystals of potassium cyanonickelate were easily centrifuged in a single pass without need for recycling mother liquor. The wet crystals were discharged to trays and loaded into a vacuum dryer. The crystals were dried at 80° C. The dried potassium cyanonickelate weighed 227½ lbs. and contained 2.0% water of hydration and 0.7% KCl (equivalent to 221½ lbs. of anhydrous $K_2Ni(CN)_4$). This represents a 52% recovery of the $K_2Ni(CN)_4$ formed. Recovery of product can be improved by conventional techniques such as salting-out by adding more potassium chloride to the mother liquor in a single batch operations, or by recycling the mother liquor in a repeated batch or semi-continuous operation.

Any soluble nickel salt can be used as starting material, providing the corresponding by-product sodium or potassium salt formed by metathesis is sufficiently soluble to insure the effect on which this method depends. This is true of the common nickel salts, e.g., acetate, chloride, bromide, iodide, nitrate, and sulfate.

Example 6

To an essentially saturated solution of 20.0 grams (0.069 gm.-mole) of nickel nitrate hexahydrate in water was added 32 ml. of a 8.62 M solution of NaCN (0.276 mole NaCN contained). The solution was thoroughly mixed and cooled at room temperature. The crystals of $Na_2Ni(CN)_4$ were suction filtered and vacuum dried at 80° C.; a 95% yield of essentially pure sodium nickel cyanide was obtained.

Example 7

To a saturated solution of 20.0 grams of nickel sulfate hexahydrate in water (containing 0.076 gm.-mole) was added 35 ml. of a 8.62 M solution of NaCN (0.304 gm.-mole). During the addition, a small amount of solid nickel cyanide, obvious because of its distinctive pale blue-green color, was formed, but this redissolved with continued mixing and yellow crystals of sodium nickel cyanide were formed. After being cooled, the crystals were filtered and vacuum dried at 80° C. A 90% yield of sodium nickel cyanide was recovered.

I claim:
1. The method for preparing a cyanonickelate of an alkali metal selected from the group consisting of sodium and potassium which comprises reacting a nickel salt with a cyanide of the selected alkali metal in relative proportion of about one mole of said salt and about four moles of said cyanide in an amount of water sufficient to dissolve the reactants but insufficient to dissolve a substantial portion of the formed alkali metal cyanonickelate when the reaction mixture is cooled to room temperature, and cooling the reaction mixture to a temperature between room temperature and about 5° C. to dissipate the heat of reaction and precipitate the major portion of the formed alkali metal cyanonickelate, and recovering the alkali metal cyanonickelate from the reaction mixture, said nickel salt being selected from the group consisting of those which form corresponding alkali metal salts having a water solubility in excess of about 25 grams per 100 grams of water at 25° C.

2. The method as claimed by claim 1 wherein the nickel salt is selected from the group consisting of nickel chloride, nitrate, acetate, bromide, iodide and sulfate.

3. The method as claimed by claim 1 wherein the nickel sulfate and the alkali metal cyanide is sodium cyanide.

4. The method as claimed by claim 1 wherein the nickel salt is nickel chloride and the alkali metal cyanide is sodium cyanide.

References Cited

Cremoux et al. Soc. Chimique de France—Bulletin, 1949, pp. 700–704.

HERBERT T. CARTER, Primary Examiner